(12) United States Patent
Savuoja et al.

(10) Patent No.: US 10,517,234 B2
(45) Date of Patent: Dec. 31, 2019

(54) METHOD, ARRANGEMENT AND USER INTERFACE FOR PRESENTING DATA DESCRIBING FOREST WORK UNIT OPERATION

(71) Applicant: PONSSE OYJ, Vieremä (FI)

(72) Inventors: Jani Savuoja, Tampere (FI); Niko Ranta, Ikkeläjärvi (FI); Jarmo Hiljanen, Iisalmi (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 15/506,954

(22) PCT Filed: Aug. 26, 2015

(86) PCT No.: PCT/FI2015/050548
§ 371 (c)(1),
(2) Date: Feb. 27, 2017

(87) PCT Pub. No.: WO2016/030576
PCT Pub. Date: Mar. 3, 2016

(65) Prior Publication Data
US 2017/0245444 A1    Aug. 31, 2017

(30) Foreign Application Priority Data

Aug. 27, 2014 (FI) ..................................... 20145742

(51) Int. Cl.
*G05B 15/02* (2006.01)
*A01G 23/00* (2006.01)
(Continued)

(52) U.S. Cl.
CPC ........... *A01G 23/00* (2013.01); *A01G 23/003* (2013.01); *A01G 23/093* (2013.01); *G05B 15/02* (2013.01);
(Continued)

(58) Field of Classification Search
CPC ............... G06Q 10/04; G06Q 10/0639; H02J 2003/003; H02J 3/14; H02J 2003/007;
(Continued)

(56) References Cited

U.S. PATENT DOCUMENTS 5,228,119 A * 7/1993 Mihalisin ................. G09G 5/00
345/418
6,374,155 B1 * 4/2002 Wallach ................... G06F 19/00
700/245
(Continued)

FOREIGN PATENT DOCUMENTS

CN        101253308 A        8/2008
CN        102085664 A   *    6/2011
(Continued)

OTHER PUBLICATIONS

CN-102085664-A Translation (Year: 2011).*
(Continued)

*Primary Examiner* — Darrin D Dunn
(74) *Attorney, Agent, or Firm* — Birch, Stewart, Kolasch & Birch, LLP

(57) ABSTRACT

A solution for presenting information describing an operation of a forest work unit includes identifying a change affecting the operation of the forest work unit and storing information relating to the change, determining at least one key indicator describing the operation of the forest work unit, and presenting the key indicator describing the operation of the forest work unit and the changes taking place during a monitoring period.

30 Claims, 5 Drawing Sheets

(51) Int. Cl.
  *G07C 5/08* (2006.01)
  *G07C 5/12* (2006.01)
  *A01G 23/093* (2006.01)
  *G09B 9/00* (2006.01)
(52) U.S. Cl.
  CPC .............. *G07C 5/08* (2013.01); *G07C 5/12* (2013.01); *G09B 9/00* (2013.01)
(58) Field of Classification Search
  CPC .......... G05B 15/02; G05B 13/048; G05B 2219/24033; G05B 2219/34306; G05B 23/0221; Y04S 10/54; Y04S 20/224; Y02B 70/3225
  See application file for complete search history.

(56) References Cited

U.S. PATENT DOCUMENTS

| | | | | |
|---|---|---|---|---|
| 6,577,323 | B1* | 6/2003 | Jamieson | G05B 23/0232 345/440 |
| 6,859,927 | B2* | 2/2005 | Moody | G06Q 10/06 718/100 |
| 6,922,681 | B2* | 7/2005 | Fromherz | G06N 5/003 706/19 |
| 7,117,067 | B2* | 10/2006 | McLurkin | G05D 1/0297 700/245 |
| 7,236,861 | B2* | 6/2007 | Paradis | F41H 13/00 701/120 |
| 8,086,955 | B2* | 12/2011 | Zhou | G06F 9/4488 715/234 |
| 8,271,132 | B2* | 9/2012 | Nielsen | B25J 9/161 318/568.17 |
| 8,428,777 | B1* | 4/2013 | Poursohi | G05B 19/41865 700/247 |
| 8,656,392 | B2* | 2/2014 | Erignac | G06F 9/52 718/100 |
| 8,914,182 | B2* | 12/2014 | Casado | G05D 1/0088 701/24 |
| 9,050,723 | B1* | 6/2015 | Elazary | G06F 11/0793 |
| 9,651,950 | B2* | 5/2017 | Jang | G06Q 10/047 |
| 9,682,481 | B2* | 6/2017 | Lutz | B25J 9/1697 |
| 9,862,089 | B2* | 1/2018 | Kuffner, Jr. | B25J 9/0084 |
| 2001/0042123 | A1* | 11/2001 | Moody | G06F 9/4875 709/226 |
| 2002/0124078 | A1* | 9/2002 | Conrad | H04L 41/00 709/224 |
| 2002/0174092 | A1 | 11/2002 | Olson et al. | |
| 2003/0120620 | A1* | 6/2003 | Fromherz | G06N 5/003 706/45 |
| 2003/0212472 | A1* | 11/2003 | McKee | G05D 1/0274 700/245 |
| 2004/0024490 | A1* | 2/2004 | McLurkin | G05D 1/0297 700/245 |
| 2004/0030571 | A1* | 2/2004 | Solomon | F41H 13/00 700/248 |
| 2005/0192760 | A1* | 9/2005 | Dunlap | A01H 1/04 702/19 |
| 2006/0095282 | A1* | 5/2006 | Belmonte | G06Q 10/00 715/219 |
| 2007/0216682 | A1* | 9/2007 | Navratil | G06T 11/20 345/440 |
| 2008/0084334 | A1 | 4/2008 | Ballew | |
| 2009/0038847 | A1 | 2/2009 | Muona et al. | |
| 2009/0234499 | A1* | 9/2009 | Nielsen | B25J 9/161 700/250 |
| 2009/0299707 | A1 | 12/2009 | Putkonen | |
| 2010/0065155 | A1 | 3/2010 | Peltomae et al. | |
| 2010/0217438 | A1* | 8/2010 | Kawaguchi | B25J 9/1661 700/248 |
| 2010/0286824 | A1* | 11/2010 | Solomon | F41H 13/00 700/248 |
| 2010/0312387 | A1* | 12/2010 | Jang | G05B 19/41865 700/248 |
| 2010/0312388 | A1* | 12/2010 | Jang | G05D 1/0088 700/248 |
| 2010/0319005 | A1* | 12/2010 | Erignac | G06F 9/52 719/315 |
| 2011/0082717 | A1* | 4/2011 | Saad | G06Q 10/06 705/7.13 |
| 2012/0323453 | A1 | 12/2012 | Havimäki et al. | |
| 2013/0123980 | A1* | 5/2013 | Seo | B25J 9/1669 700/248 |
| 2013/0217421 | A1* | 8/2013 | Kim | H04B 1/38 455/456.3 |
| 2013/0325158 | A1* | 12/2013 | Kobayashi | G05B 23/0243 700/108 |
| 2014/0025228 | A1* | 1/2014 | Jang | G06Q 10/047 701/2 |
| 2014/0067108 | A1* | 3/2014 | Pedigo | G05B 19/41865 700/108 |
| 2014/0188576 | A1 | 7/2014 | De Oliveira et al. | |
| 2014/0222197 | A1* | 8/2014 | Letsky | A01D 34/008 700/245 |
| 2014/0250225 | A1* | 9/2014 | Sellers | H04L 41/0213 709/224 |
| 2014/0365258 | A1* | 12/2014 | Vestal | G06Q 10/063114 705/7.15 |
| 2015/0148951 | A1* | 5/2015 | Jeon | G05D 1/0219 700/248 |
| 2015/0185729 | A1* | 7/2015 | Kuffner, Jr. | B25J 9/0084 700/248 |
| 2016/0019484 | A1* | 1/2016 | Srivastava | G06Q 10/06313 705/7.17 |
| 2016/0129592 | A1* | 5/2016 | Saboo | G06Q 50/28 700/248 |
| 2016/0132059 | A1* | 5/2016 | Mason | G05D 1/0246 701/28 |
| 2016/0354923 | A1* | 12/2016 | Kuffner, Jr. | B25J 9/0084 |
| 2016/0378110 | A1* | 12/2016 | Phillips | G05D 1/0033 701/2 |
| 2017/0308096 | A1* | 10/2017 | Nusser | B65G 1/137 |
| 2017/0336789 | A1* | 11/2017 | Sane | B64C 13/04 |
| 2018/0006888 | A1* | 1/2018 | Vaughn | H04L 41/0826 |
| 2018/0039265 | A1* | 2/2018 | Lawler | G05D 1/0027 |
| 2018/0050450 | A1* | 2/2018 | Parrott | H04W 4/80 |
| 2018/0085914 | A1* | 3/2018 | Kuffner, Jr. | B25J 9/0084 |
| 2018/0147721 | A1* | 5/2018 | Griffin | B25J 9/161 |
| 2018/0188747 | A1* | 7/2018 | Venturelli | G08G 5/0069 |
| 2018/0201444 | A1* | 7/2018 | Welty | B65G 1/0492 |
| 2018/0239343 | A1* | 8/2018 | Voorhies | G05D 1/0234 |

FOREIGN PATENT DOCUMENTS

| | | |
|---|---|---|
| CN | 103032163 A | 4/2013 |
| CN | 103901789 A | 7/2014 |
| JP | 2000-207318 A | 7/2000 |
| RU | 2427038 C2 | 8/2011 |
| WO | WO 2005/078381 A1 | 8/2005 |
| WO | WO 2011/064453 A1 | 6/2011 |

OTHER PUBLICATIONS

John Deere, "Timbermatic 300 700 900 Measuring, Control and Communication System," URL: https://colheitademadeira.com/br/wp-content/uploads/publicacoes/246/Timbermatic%20Measuring%20and%20Control%20Systems.pdf, May 31, 2005, XP055462177, pp. 1-15 (16 pages total).

Partial Supplementary European Search Report for European Application No. 15836344.0, dated Apr. 9, 2018.

Extended European Search Report, dated Apr. 2, 2019, for European Application No. 15836344.0.

Chinese Office Action and Search Report, dated Feb. 28, 2019, for Chinese Application No. 201580045836.6, along with an English translation.

Russian Office Action and Search Report for Russian Application No. 2017106934/11, dated Jan. 15, 2019, with English translation of the Office Action.

(56) References Cited

OTHER PUBLICATIONS

Chinese Office Action and Search Report, dated Jul. 9, 2018, for Chinese Application No. 201580045836.6, along with an English translation.

* cited by examiner

METHOD, ARRANGEMENT AND USER INTERFACE FOR PRESENTING DATA DESCRIBING FOREST WORK UNIT OPERATION

BACKGROUND

The invention relates to forest work units and, in particular, to a method, arrangement and user interface for presenting information describing forest work unit operation.

In what is known as cut-to-length logging, the timber logged from a forest is cut to timber pieces of a desired length already at the logging area. The effectiveness and cost efficiency of felling and cutting forest work units are influenced by a number of factors. Similar questions relate to the monitoring of the performance and cost efficiency of processes carried out by other kinds of forest work units, such as forwarders, and it is not at all always self-evident to the driver whether a work method is efficient from the point of view of productivity, energy consumption or other costs, for example.

Current solutions often make it difficult for the driver to monitor work efficiency sensorily. Sensory monitoring of the machine operation may even lead the operation to a wrong direction because although the running of an engine, for example, may sound efficient, in reality the engine perhaps could be used in a more economical way. Use of sensory methods for controlling efficiency of work performance is especially hampered by the large scale and complexity of modern systems. Mutually comparable work phases, such as similar handling of similar type of timber, do not necessarily take place one after the other but the type of timber may vary, which makes real efficiency difficult to monitor sensorily. Automation often plays a significant role in the whole and it, too, may complicate sensory observation and recognition of work efficiency. Attention may be drawn to wrong things, such as monitoring of single, easily observable key indicators, and an attempt to increase efficiency may, in the end, even lead to a decrease in efficiency.

SUMMARY OF THE INVENTION

It is thus an object of the invention to provide a novel method and an arrangement implementing the method, and a user interface. The object of the invention is achieved by a method, arrangement and user interface which are characterised by what is disclosed in the independent claims. Preferred embodiments of the invention are disclosed in the dependent claims.

The invention is based on identifying changes, storing information on the changes and utilizing the information on the changes to present key indicators describing an operation of a forest work unit.

An example of the advantages of the method and arrangement of the invention is that it enables to present to a user, in an illustrative manner, changes affecting a forest work unit operation and their effect on a key indicator describing the forest work unit operation and thereby on the operation of the forest work unit, e.g. to the efficiency of the forest work unit operation. Some other advantages are discussed in greater detail in connection with the detailed disclosure.

LIST OF FIGURES

The invention is now described in closer detail in connection with preferred embodiments and with reference to the accompanying drawings, in which.

DETAILED DESCRIPTION

Figure 1:
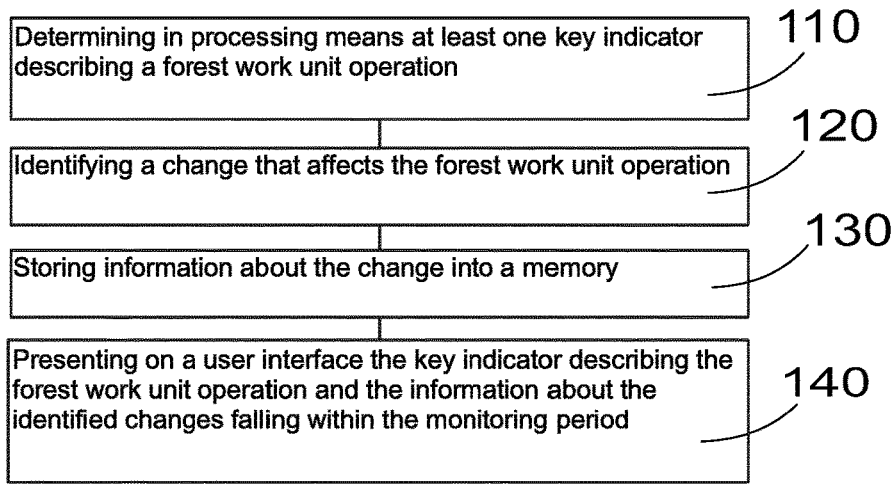
FIG. 1 illustrates a method for presenting to the user information describing an operation of a forest work unit.

FIG. 1 illustrates a method for presenting to the user information describing an operation of a forest work unit. The information describing the operation preferably illustrates the efficiency of the forest work unit, which may be measured, depending on the embodiment, by e.g. productivity gauges, energy efficiency meters, such as fuel flow meters, or time counters, such as work cycle time recorders. The information is presented to the user, who may be a forest work unit driver, forest entrepreneur, trainer or a similar user interested in the efficiency of the forest work unit.

In the method of FIG. 1 at least one key indicator describing an operation of a forest work unit is determined 110 in a processing means 31. The key indicator may describe for example a measure indicating a continuously measurable operation of the work machine, such as fuel consumption, a measure indicating a work phase, such as work phase duration, or a measure associated with the handling efficiency of an individual unit to be handled, such as one stem, one load or one work site, e.g. fuel consumption per stem or load to be handled. Measures indicating the efficiency of work unit handling may then be further presented either at a work unit level or at a larger reference group level. The reference group concerned may comprise a number of work units. The group may be selected, or the user may select it, by applying any one of the manners described in connection with the embodiments disclosed. A predetermined work phase may be one of the following, for example: feed to butt, felling cut, feed start, feed, feed to target length, bucking, topping, run under load, run without load, loading and unloading. In an embodiment, the monitored work phase may also comprise a combination of two or more of these, usually successive, work phases, i.e. a total time required by two successive work phases may be measured, for example.

The work phase may be identified either automatically in the information system of the forest work unit, for example, or identification may be based on data input by the user on a change of work phase. In other words, a work phase may be identified in response to information received from the information system on a change of work phase and/or in response to data input by the user over user interface 33, for example, on the work phase change. Automated identification of a work phase may be based e.g. on the status data of the forest work unit, on data obtained from the sensors of the forest work unit or on other data on the basis of which the work phase may be identified automatically.

The key indicator indicating a work phase may be e.g. the duration of the work phase in seconds, for example, fuel consumption in litres, for example, per time unit, such as an hour, or per an amount of timber handled, such as a cubic meter or ton handled, or the output in cubic metres or tons per time unit or per an amount of fuel consumed.

In addition, the method includes identifying 120 a change affecting the operation of the forest work unit. Information about the change is stored 130 into a memory 32. The information on the change preferably comprises at least the point of time of the change in relation to a time or some other cumulative variable, such as transport distance, position, such as a map coordinate, the amount of fuel consumed or the cumulative number of work units handled, or surface area. Still more preferably the information on the change may also comprise other change data, such as the type of the change, the value of a changed setting before the change, the value of a changed setting after the change, a changed condition before the change, a changed condition after the change, a changed work method before the change and/or a changed work method after the change.

A change to be identified and stored is preferably a change that has an influence on the operation of the forest work unit. The change to be identified and stored may preferably be a change that is assumed to have on effect on the key indicators to be monitored or one whose effect on the key indicators to be monitored is to be analysed, i.e. it is possible to flag, so to speak, information collected on stems. It is thus possible to monitor direct or derived key indicators, such as stem-specific or load-specific values or representative values, such as averages, medians, fractiles, sums and/or other derived/computational values, before and after the change. The change in question may be a change related to the work site and/or working conditions, such as a change of work site or project, change of tree type, change of terrain, such as slopes in the working area, start or end of a pre-cleared area, or the effect of weather conditions on the work and the ground, a change in settings, such as a manual or automatic change of a machine setting, servicing, repair or maintenance of the forest work unit or a part thereof, for example servicing or replacement of a worn part, or a change in work methods, such as a change of driver, adoption of a different work method, or some other similar change.

On the other hand, the change may also be an indicative change, such as a change in a key indicator to be monitored, although the reason for the change had not been identified. In that case the key indicator may be given for example a control value, such as a target value, alarm value or some other threshold value, and the change may consist of reaching the target value or some other threshold value or an alarm value set for the key indicator, for example. Furthermore, an indicative change may be an identifiable trend in the key indicator being monitored, e.g. a predetermined number of successive decreasing or increasing key indicator values, or a dispersion deviating from the normal in the threshold values or the measurement values used for determining it. The identified and stored change may then be used afterwards, for example, to determine the cause of the change, even when the effect of the change to the operation of the forest work unit could not be anticipated. On the other hand, if the link between this kind of identified indicative change and the forest work unit operation is known in advance, the identified and stored change and the change data associated therewith may be utilized also for anticipating a service need of the forest work unit or its components, such as a need to replace a part that wears, such as a saw chain.

The change affecting the operation of the forest work unit may thus comprise at least one of the following: a change relating to the work site, change relating to working conditions, change in settings, servicing, repair or maintenance operation carried out on the forest work unit or a part thereof, change in working method and a change in a key indicator to be monitored, meaning that a predetermined target value or trend of the key indicator being monitored is achieved.

The change may be identified either automatically by means of the processing devices on the basis of the data collected by the information system of the forest work unit, for example, or the identification may be based on data input by the user on a change, i.e. the change may be identified in response to information received on the change from the information system of the forest work unit and/or in response to data input by the user on the change through the user interface 33, for example.

The user interface 33 may enable editing, deleting and adding changes and information relating to changes afterwards. Hence, in an embodiment, the user may also afterwards manually add, for example, through the user interface a flag to a desired point to indicate a change, i.e. store data on the change, at least the time of the change, at a later stage, for example when key indicators describing a work phase are being examined and/or after a subsequent change has already been stored. The user may then add missing information on the change that has remained unidentified and/or has not been entered, for example. In yet another embodiment, the user may afterwards add information to the change data, e.g. a more precise description of the event or the change that has been made. In yet another embodiment, through the user interface the user may edit stored changes, e.g. the point of a change in relation to a cumulative variable, such as a point of time, and/or change data associated with the change, and/or delete a stored change. The user may thus correct any incorrectly stored information or, for example, information distorting the determined key indicators due to exceptional factors. On the other hand, the user may use this adjustment of the changes, i.e. the "flags", to visually bracket on the user interface for example time ranges or other criteria with which the best or the worst key indicator values have been obtained for determining the factors that influence the forest work unit operation the most and for improving productivity of work.

When necessary, one or more key indicators describing a forest work unit operation, such as a work phase, may be re-determined. If one or more changes are added afterwards, they may have an effect on the key indicators and/or factor used to compute these, such as samples to be monitored or reference samples, e.g. stems, loads, stem groups or load groups, periods of time to be monitored and/or other reference and/or grouping criteria. This may require re-determining a key indicator or key indicators by re-grouping the corresponding measurement values on the basis of the point of time and/or other reference criteria.

The effect of such changes may preferably be extrapolated to a period longer than the monitoring period, e.g. to an annual level, whereby the effect of a change e.g. on annual efficiency, amount of timber handled, fuel consumption, average price, output, costs or some other end result of interest may be evaluated. Then again, instead of or in addition to this, it is also possible to evaluate how economical or adaptable a specific change is in prevailing work site conditions. The effect of a change may also be extrapolated for a similar purpose to some other period of a cumulative variable longer than the monitoring period, such as a work shift, work site or the like.

In addition, in the method of FIG. 1 a key indicator describing the operation of a forest work unit as a function of time and identified information on changes relating to the monitoring period are shown 140 in the user interface 33. The user is thus able to clearly see possible changes in work efficiency. The key indicator may be a direct key indicator, such as stem- or load-specific key indicator or a derived or computational key indicator, such as a representative value or an extrapolated value on annual level effects, for example. The effects of a change may thus be presented for a sufficiently long time span to make their economic and other effects easily understandable. For example, a difference of a second or some seconds in the handling time of an individual stem is not necessarily easy to discern, but by calculating its effect per hour or on the number of stems handled during a work shift, or in terms of euros during the work shift or time spent to complete the work site/working area, the effect of the change is significantly easier to understand. In other words, use of concrete and appropriate concepts and entities, either alone or together with absolute values, to present key indicators significantly facilitates evaluation of the effect of a change that has been carried out or taken place regarding work efficiency.

The key indicator may preferably be presented in the user interface 33 as a graph in which the key indicator is shown as a function of time or some other cumulative variable in the form of a line graph, area graph or histogram or some other diagram, and the changes are indicated (flagged) on the graph at a point on the axis representing the cumulative variable that corresponds to the time of the change. In an embodiment, when derived or computational key indicators in particular are presented, also computational comparison may always be restarted at the point of change in question. In other words, for example representative values, such as average values, medians, fractiles, sums or other derived/computational values, may be calculated separately in each case for key indicator values determined between two such points of change.

In an embodiment, manual and automatic changes as well as flags placed by the user may be displayed in different ways in the graph, e.g. with flags of different outer appearance or with other markings. In yet another embodiment, it is possible to display on the user interface, either continuously or by the user acting on the flag point on the user interface, the changes that have taken place at the flag.

Figure 2:
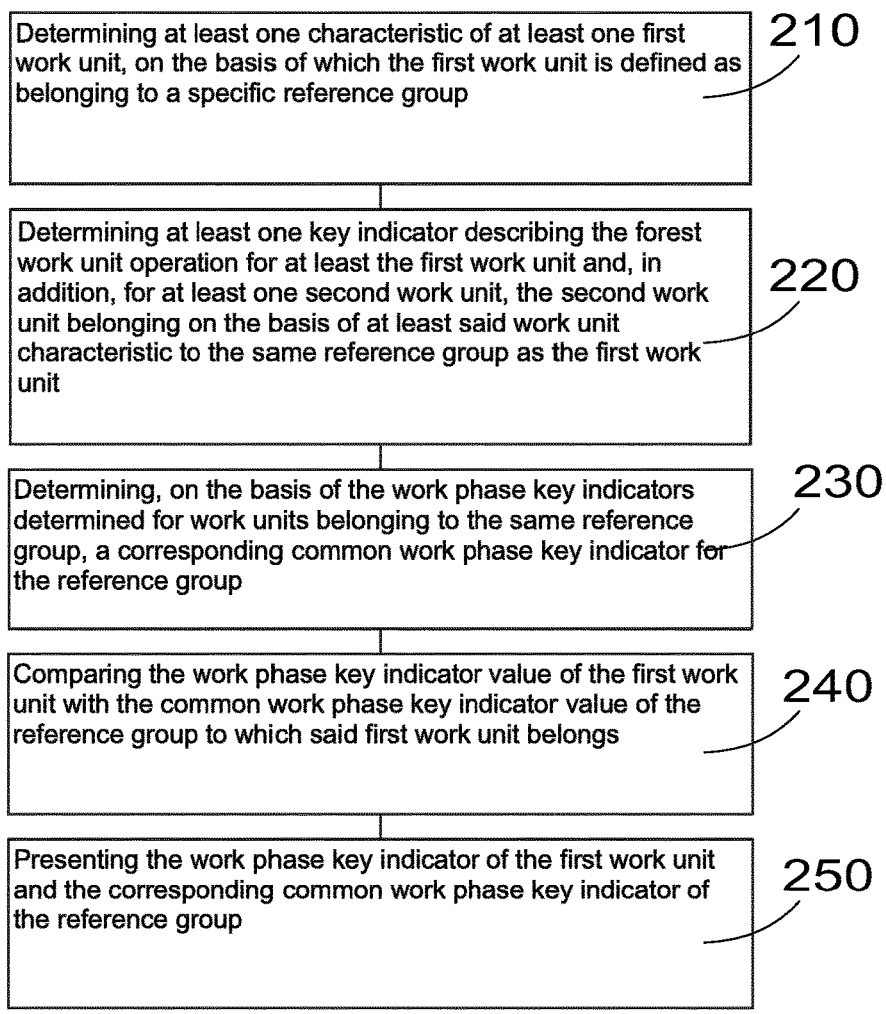
FIG. 2 illustrates a method for presenting to the user information describing an operation of a forest work unit.

FIG. 2 shows a method for presenting to a user information describing the operation of a forest work unit. In addition to or instead of the method of FIG. 1, information describing the operation of the forest work unit and the key indicators representing the information may also be determined on the basis of a division into reference groups of the units subject to the forest work unit operations, which in this disclosure are referred to as work units. This division may be made dynamically on the basis of a group of units to be handled in each particular case, instead of a division based on predetermined categories. The processing means of the forest work unit may thus divide handled work units continuously, for example, into a predetermined number of reference groups, whereby the threshold values of the reference groups, i.e. the criteria on the basis of which a work unit belongs to a specific reference group, may change as the work proceeds. In other respects the method may correspond to the one shown in FIG. 1.

In the embodiment of FIG. 2, at least one characteristic of at least one first work unit is determined 210 in the processing means, the characteristic being then used as a basis for determining the work unit as belonging to a specific reference group. The embodiment of FIG. 2 further includes determining 220 in the processing means at least one key indicator describing the operation of the forest work unit for the first work unit and, in addition, for at least one second work unit, the second work unit belonging at least on the basis of said work unit characteristic to the same reference group as the first work unit.

Further still, the embodiment of FIG. 2 includes determining 230 in the processing means, on the basis of the key indicators describing a work phase and determined for work units belonging to the same reference group, a corresponding key indicator common to reference group and describing the work phase, and comparing 240 in the processing means the key indicator value describing the work phase of the first work unit with the value of the key indicator describing the work phase and common to the reference group to which the first work unit belongs. The method of FIG. 2 still further includes presenting 250 on the user interface the key indicator describing the work phase of the first work unit and the corresponding key indicator describing the work phase common to the reference group.

In an embodiment, the method of FIG. 2 may be implemented in addition to the method of FIG. 1, in which case the key indicators according to the methods of FIG. 1 and FIG. 2 are presented separately as described in connection with the respective methods. The key indicators and their manner of representation according to the methods may be shown on a same user interface or on different user interfaces and either simultaneously or at partly or entirely different times. In an embodiment, one or more key indicators describing the operation of the forest work unit is presented on the user interface in accordance with the method of FIG. 2, and when one user interface element representing the key indicator in question is acted on in the manner disclosed in connection with the description of the user interface, the corresponding key indicator may, in addition, be shown on the user interface, in accordance with the method of FIG. 1. In a second embodiment, on the other hand, it is possible to combine the methods of FIGS. 1 and 2 to present one and the same key indicator. In that case the reference group used in the method of FIG. 2 is restricted on the basis of the identified and stored changes presented in connection with the method of FIG. 1. Hence the reference group may comprise the work units falling between two successive changes or between the start and finish of a work and/or a change that comes closest to these. In other words, in that case the characteristic that associates a work unit with a reference group may be its position in a predetermined manner before or after a specific change or between two changes affecting the operation of the forest work unit. Naturally, there may also be several characteristics associating a work unit with a reference group, i.e. reference group selection criteria, and thus when the work unit is a stem, for example, and the reference group is a stem group, the size category of the stem, in addition to the time of handling, may have an effect on which group of stems the stem in question belongs to.

A key indicator describing a work phase may be one of the key indicators mentioned in connection with the description of FIG. 1, for example.

In an embodiment, the first work unit may comprise one of the following: a stem, load, work site, first stem group, first load group and first work site group. Naturally, in that case the second work unit belonging to the same reference group is also of the same work unit type, i.e. comprises also one of the work unit types given in the above list. In an embodiment, the work unit may be a work unit being handled at the time of the determining or a work unit completed as regards the work phase monitored last.

In an embodiment, the reference group comprises one of the following: a second stem group, second load group and second work site group. In that case, e.g. when the work unit is a stem and the second stem group is the reference group, the key indicator of the stem may be compared with that of the stem group. On the other hand, when the work unit is the first stem group, e.g. a group of stems handled within a shorter period of time, and the reference group is the second stem group, e.g. a group of stems handled within a longer period of time, the key indicator of the first stem group may be compared with a reference value of the second stem group.

In yet another embodiment, key indicators may be presented for two or more reference groups to which the work units are selected on partly or entirely mutually exclusive criteria. In other words, a first reference group may comprise entirely or partly different work units than a second reference group. In that case one and the same key indicator may be compared, for example, relative to a work shift before and after a break. This may be useful e.g. from the point of view of work and work shift planning, evaluation of the driver's alertness or for anticipating service, repair and maintenance operations for the forest work unit, for example. In particular, when large work units, such as work sites, are concerned, a yet another embodiment provides a possibility to correspondingly compare a work unit with another work unit belonging to the same reference group, i.e. with a work unit preferably similar with regard to at least some characteristic. This may be advantageous and reasonable when large work units are concerned, because accumulation of data required for forming a statistically significant representative value typically takes a lot of time.

In an embodiment, the forest work unit may be a felling and cutting forest work unit, such as a harvester or what is known as a combination machine, i.e. a combination of a harvester and a forwarder, and targets of the operations, i.e. the work units, may be stems to be handled, e.g. to be felled or cut.

In that case it is then possible to determine 210, similarly as in the method of FIG. 2, in the processing means 31 at least one characteristic of at least one individual stem handled last or being handled at the moment of the determining, the stem being then determined as belonging to a specific group of stems on the basis of the characteristic. The characteristic may be at least one of the following or a combination of these: stem diameter at a predetermined height, tree type and stem volume. An individual stem handled last or being handled at the time of the determining refers to a stem that is being handled at the time the characteristic of the stem is being defined or to a stem the handling of which has been completed last. For the sake of clarity, the terms 'stem' and 'individual stem' are used in this disclosure to refer to a stem of the above type that is being handled at the time of the determining or that was handled last, unless the context clearly shows that the term has been used to mean something else.

The disclosed embodiment further includes determining 220 at least one key indicator in the processing means 31 to describe a predetermined work phase of the forest work unit with regard to said individual stem and, in addition, to at least one other individual stem, this other individual stem belonging, on the basis of at least said stem characteristic, to the same stem group as said individual stem. The predetermined work phase may be e.g. one of the following: feed to butt, felling cut, feed start, feed, feed to target length, bucking and topping.

A key indicator describing a work phase may be one of the key indicators mentioned in connection with the description of FIG. 1, for example. In that case the key indicator describing the work phase may preferably be determined not only to an individual stem but also to all stems in the same stem group or to a predetermined sample of stems from the stem group. The same determining may naturally be repeated to all stem groups separately.

In an embodiment, it is further possible to identify a change affecting the operation of the forest work unit according to the method of FIG. 1. Information about the change may be stored into the memory 32. Identification and storing of the information may be carried out as disclosed in connection with the embodiment of FIG. 1.

In yet another embodiment it is possible to determine 230 in the processing means 31, on the basis of the key indicators describing a work phase determined for individual work units belonging to the same stem group, a corresponding a common work phase key indicator of the stem group. This common work phase key indicator may be a representative value of the key indicator describing the work phase, for example. In the different embodiments the representative value may be computed for an entire sample between two events of change, e.g. to a stem group, and/or the representative value may be computed as a rolling value in which a certain number of stems, loads, work cycles or similar objects of measurement are taken into account and/or the computation is re-started after each event of change. The representative value may be determined separately in each case from the beginning of the monitoring period to the first point of change, for the period between two successive times of change and from the last change in the monitoring period to the end of the period.

When a key indicator describing a work phase has been determined for an individual stem handled last or being handled at the time of the determining, and a corresponding common work phase key indicator of the stem group has also been determined, the key indicator of the individual stem may be compared with that of the stem group, more precisely with the key indicator of the stem group to which the individual stem belongs. It is thus possible in the method to compare 240, as shown in FIG. 2, in the processing means 31 the value of said key indicator describing a work phase of an individual stem to a common value of a work phase key indicator of the stem group to which said individual stem belongs. An advantage of this solution is that the key indicator used in the comparison is as comparable as possible with the key indicator of the individual stem.

In yet another embodiment, a key indicator describing the operation of the forest work unit may be presented 250 in the user interface 33 with regard to a work unit, such as an individual stem, and a reference unit, such as a stem group. In an embodiment, it is also possible to present these key indicators as a function of time, or some other cumulative variable, and the identified information on changes relating to the monitoring period, similarly as in the method of FIG. 1. This may be carried out in a manner corresponding to that disclosed in connection with the embodiment of FIG. 1, for example. However, in connection with the method according to the embodiment of FIG. 2, it is possible to present, instead of or in addition to the key indicator presented as a function of a cumulative variable, a key indicator describing a work phase of a work unit being handled and/or that was handled last and/or a corresponding key indicator describing a work phase and common to the reference group, depending on the embodiment. The user is thus able to clearly see possible changes in work efficiency. What is particularly advantageous is that the comparison is made with the driver's own previous comparable measurement data, and thus the effects of changes in settings, for example, are more clearly shown. In solutions in which the key indicators are compared with table values or to reference values of a larger and more heterogeneous sample, the number of factors influencing the key indicators grows so high that the effect of the changes made can no longer be made clear. As described in connection with the other embodiments, a corresponding method may also be applied to a forwarder, in which case the work unit and the reference group may naturally be different. On the other hand, FIG. 6 and the disclosure related thereto show a method in which the forest work unit is a forwarder or a combination machine. The method is naturally correspondingly applicable to a harvester.

The reference group, i.e. one or more work units to be included in the reference group, and/or other data to be used for computing a key indicator may be selected in different ways in the different embodiments. The data may be determined on the basis of identified and stored changes. In that case the data to which a specific work unit belongs is determined by whether the work unit has been handled before or after a certain change. In other words, the work unit belongs to specific data because it has been handled between two specific changes, before the first change, or after the last change. However, the reference group and/or some other sample may also be determined on the basis of the characteristics of the work unit. For example, stems belonging to a particular size category, a load consisting of a specific type of timber, or a work site on a specific type of terrain may be included in a specific reference group or other data or be left out due to its characteristic.

In an embodiment, the reference group or other data used for determining the key indicator is determined automatically on the basis of one or more pre-determined criteria, such as identified and stored changes and/or at least one characteristic of a work unit. In addition to or instead of the above, the user may, in an embodiment, select a work unit or work units to be included in or excluded from the data by acting on the user interface and selecting by means of the user interface at least one criterion on the basis of which work units are selected for the data, such as a reference group, to be used for computing a key indicator. In other works, the method enables the user to apply the user interface so as to select at least one criterion for restricting the data to be used for determining a key indicator. The user may thus choose which characteristic or other factor will serve as the basis for including work units into or excluding them from a reference group and/or other data used for determining a key indicator. In an embodiment the user may, in addition to or instead of the above, also select individual work units for inclusion or exclusion. In that case the user excludes from the data e.g. exceptional or incorrect measurement results, such as a work phase time for a work phase interrupted by an external element or the measurement of which was significantly affected by an exceptional external element.

Figure 3:
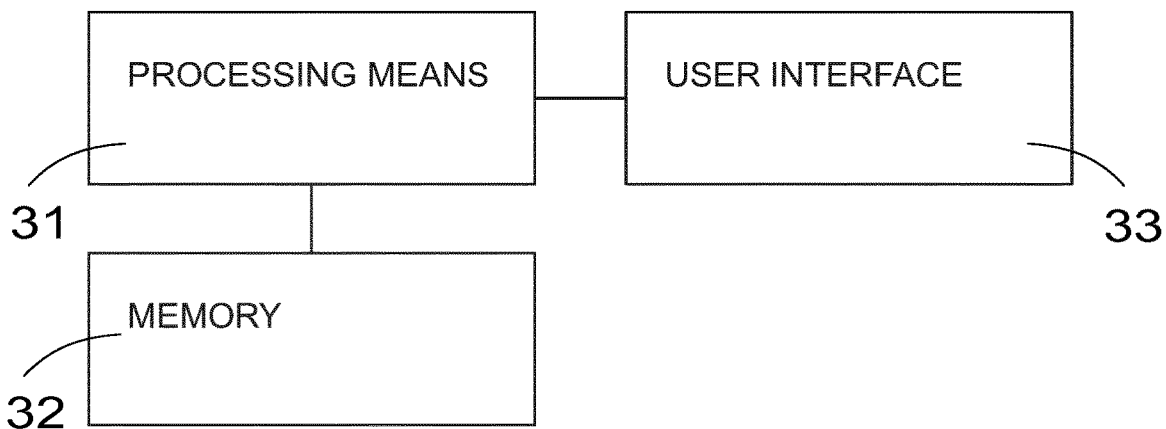
FIG. 3 illustrates an arrangement for providing feedback to the user on an operation of a forest work unit.

FIG. 3 is a schematic view of an arrangement for providing feedback to the user on the operation of a forest work unit. The arrangement comprises at least processing means 31, memory 32 and user interface 33. With the arrangement, it is possible to implement at least the method of FIG. 1 or some other method disclosed herein, e.g. any one of the methods disclosed in connection with FIGS. 1, 2 and/or 6 or a combination thereof, for providing feedback to the user on the operation of the forest work unit by configuring the processing means 31, the memory 32 and/or the user interface to carry out the described tasks/operations and/or method steps.

The processing means 31 may preferably comprise the processing means of the forest work unit, the memory 32 may comprise the memory of the forest work unit, and the user interface 33 may comprise the user interface of the forest work unit, and these may be either fixedly or removably arranged to the forest work unit or form a separate unit of their own, available for use in connection with the forest work unit, e.g. when arranged to a mobile device or a similar portable device. However, in an embodiment a similar arrangement may be provided, in addition to or instead of the above, to a separate unit that may be controlled at a distance from the forest work unit.

Figure 6:
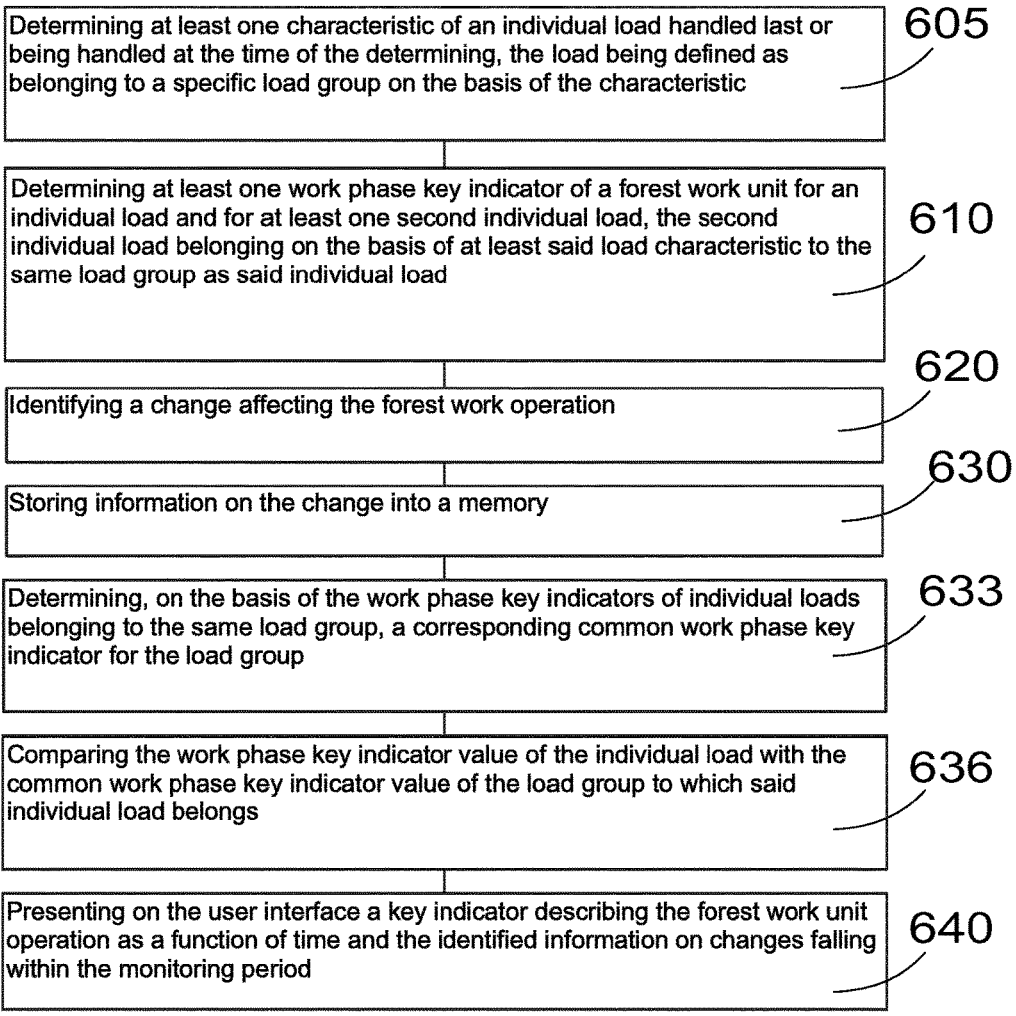
FIG. 6 illustrates yet another method for presenting to the user information describing an operation of a forest work unit.

With regard the methods of FIGS. 1, 2 and 6, for example, the processing means 31 may be configured to at least determine at least one key indicator describing the operation of the forest work unit. In addition, in an embodiment it is possible to identify in the processing means 31 a change affecting the operation of the forest work unit. The identified change may be stored into the memory 32.

As regards the method of FIG. 2, for example, the processing means 31 of the arrangement may be configured to at least determine at least one characteristic of at least one first work unit, on the basis of which the work unit is then determined as belonging to a specific reference group, and at least one key indicator describing at least one predetermined work phase of the forest work unit for the first work unit and for at least one second work unit, the second work unit belonging to the same reference group as the first work unit at least on the basis of the work unit characteristic in question. The characteristic determining the reference group of a work unit may be determined e.g. by fetching from the memory 32 the feature data in question of the work unit concerned. Depending on the embodiment, the memory 32 may be a memory of the processing means 31 or an external memory, for example. The property data, in turn, may be based on information received from sensors, for example, or other sensing devices connected to the forest work unit or to property data of the work unit measured or collected in some other way. The criteria for belonging to a specific reference group may be based on for example pre-determined threshold values determined for a characteristic, such as maximum and minimum threshold values of the characteristic. In an embodiment the criteria defining a reference group or at least one such criterion may be formed by determining threshold values in a dynamic manner, e.g. by determining in advance that the work units to be handled, such as timber to be felled and cut, is divided into a pre-determined number of reference groups, such as stem groups. In yet another embodiment it is possible to determine in advance the number of work units for each reference group and the threshold values of each reference group may be determined dynamically on the basis of the characteristics of the individual work units and the number of work units in the reference group.

In addition, with regard to the method of FIG. 2, for example, the processing means 31 may be configured to determine, on the basis of the key indicators describing a work phase and determined for work units belonging to the same reference group, a corresponding key indicator describing the work phase and common to the reference group and to compare in the processing means the value of the key indicator describing the work phase of said work unit with the value of the key indicator describing the work phase common to the reference group to which the first work unit belongs.

The processing means 31 may comprise a programmable logic and/or programmable microprocessor, for example. In an embodiment, the processing means 31 may comprise an embedded information system which is known per se in advanced mobile work machines and between the different parts of which information is transferred via a data transmission bus known per se, for example a CAN (Controller Area Network) bus.

With regard to the method of FIGS. 1, 2 and 3, the user interface 33 may be correspondingly configured for example to present a key indicator describing the operation of the forest work machine and the information on identified changes relating to the monitoring period.

Furthermore, with regard to the method of FIGS. 2 and/or 3, the user interface 33 may be configured to present the key indicator describing the work phase of the work unit and the corresponding key indicator describing the work phase common to the reference group.

The user interface 33 may comprise e.g. a display 34 and/or different selection means 25, such as buttons, mouse, joystick and/or touch screen, with which the user may enter input to the information system. In the different embodiments, the arrangement may comprise a forest work unit, forest work simulator, or general-purpose computer.

Figure 4:
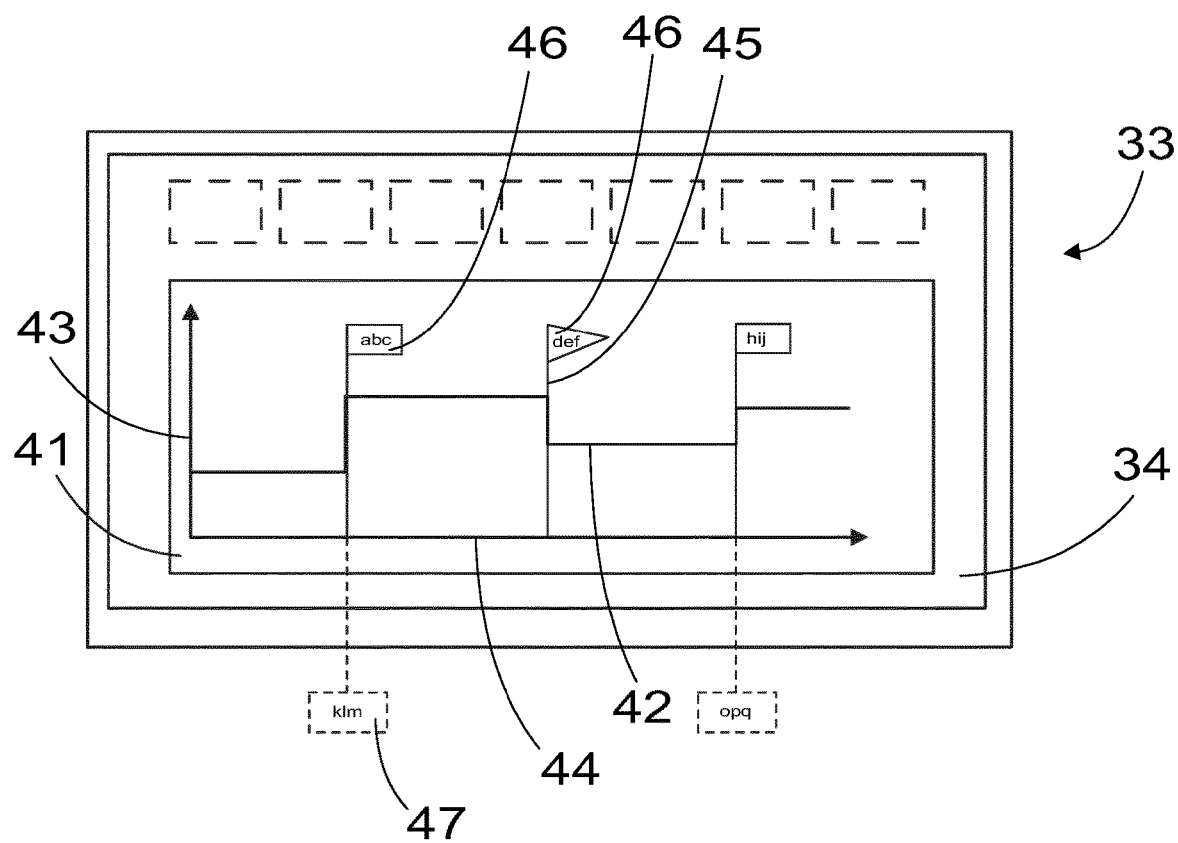
FIG. 4 illustrates a user interface.

FIG. 4 shows a user interface 33. The user interface 33 may comprise at least a first user interface element 41, which is configured to display at least a graphic representation on the display 34. In the example of FIG. 4, the graphic representation comprises a graph 42, such as the line graph as in the embodiment of FIG. 4, in which a key indicator is presented on a first axis 42, i.e. the y-axis in FIG. 4, and a cumulative variable, such as time in the embodiment of FIG. 4, is presented on a second axis 44, such as the x-axis, changes being shown by indicator lines 45, such as vertical indicator lines, which are arranged at a point on the x-axis 44 corresponding to the occurrence of the change with respect to the cumulative variable. The graph presentation may differ between the different embodiments. The key indicator, which may be a direct or a derived/computational key indicator, may be alternatively presented on the x-axis and time on the y-axis, and/or the key indicator may be presented as an area graph or a bar diagram, for example. When a bar diagram is used as the display format of the graph, indicator lines for presenting changes may be replaced by indications of the points where the bars change.

Information about the change may be provided in connection with the indicator line 45 presenting the change. A flag pattern 46, for example, may be provided at the top or the bottom of the indicator line 45 presenting the change. The flag pattern 46 may comprise information about the change given in the form of text arranged to the flag pattern and/or by the outer appearance of the flag pattern 46. In other words, information about a change in the form of text may be provided in connection with the flag pattern 46, e.g. inside, next to, below or above the flag pattern 46. Instead of or in addition to this, information on changes may be shown by the outer appearance of the flag pattern 46, for example by selecting a flag pattern 46 with a different outer appearance in connection with different types of changes. The outer appearance of the flag pattern 46, which is determined on the basis of the type of the change, may in that case comprise e.g. the geometrical shape of the flag pattern 46, the colour of the flag pattern 46, the size of the flag pattern 46 and/or the format, colour and/or size of the text arranged in connection with the flag pattern 46. The type of change in question may be a source of change, such as a change in conditions, in the settings of the forest work unit or in working methods. On the other hand, the type may also be a method of identifying or storing the change, such as an automatically identified change or information stored by the user on the change. The changes stored by the user may further consist of different types of change, such as information entered by the user on the change at the time the change takes place or a change or information on a change added or edited afterwards. In some embodiments, an automatically identified change or one stored by the user to which the user adds something or which s/he edits in some way may also be considered as a separate change type. A geometrical shape may be a circle, triangle, square, rectangle, ellipse, polyhedron or some other appropriate and preferably easily distinguishable shape.

Information on a change in a text format may also be arranged in the form of a text into a separate information element 47, which may be arranged to the top or bottom of the indicator line 45 indicating the change, for example. If both the flag pattern 46 and the information element 47 are arranged in connection with the indicator line 45 representing a change, they may preferably be arranged to opposite ends of the indicator line representing the change. In an embodiment, the flag pattern 46 and the information element 47 may, on the other hand, be arranged close to one another, e.g. to the same end of the indicator line 45 or to the same side of the indicator line 45. Information on a change in the form of a text may comprise for example the time of the change or its relation to some other accumulative information as well as other change data, such as the type of the change, a forecast on the effect of the change on a period of a cumulative variable longer than the monitoring period. In yet another embodiment, more precise change data such those above, or some of them, may be arranged to be presented, in a manner known per se, only when the user acts on the indicator of the change, such as the indicator line 45, flag pattern 46 and/or information element 47, over the user interface. Acting on the indicator of the change may in that case comprise pointing the indicator of the change either directly or indirectly by means of a separate joystick and/or button, for example. More precise change data may be presented in a manner known per se for as long as the indicator of the change is acted on, for a predetermined time, or until the information is hidden by a predetermined control action, for example by re-acting on the indicator of the change.

Figure 5:
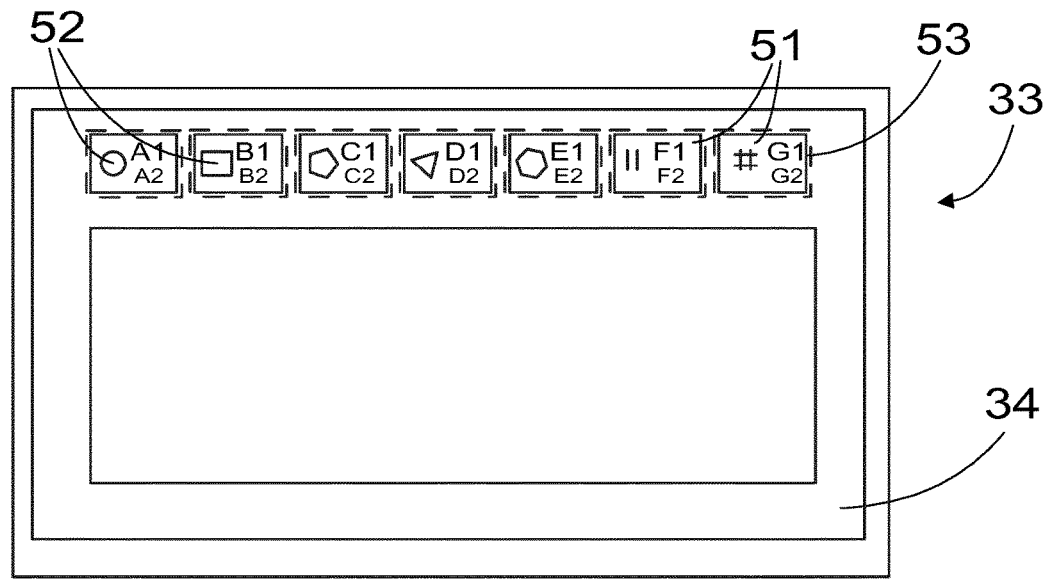
FIG. 5 illustrates a user interface.

FIG. 5 shows a user interface 33 that may be associated with the method of FIG. 2, for example, and to an arrangement for implementing the method. In an embodiment, the user interface 33 may comprise at least two second user interface elements 51, each one of which is arranged to show one key indicator for the first work unit and, on the other hand, a corresponding key indicator for the reference group to which the work unit in question belongs. In FIG. 5 each key indicator of the work unit is presented with references A1 to G1 and the corresponding key indicators of the reference group with references A2 to G2.

The user interface 33 may preferably be arranged to present a successful and a failed work unit with a key indicator of a different outer appearance, which makes it easy for the user to identify the failed work unit. The references A1 to G1 presenting the work unit key indicator may be shown e.g. with a different colour, in a different size, or the background colour of the other user interface element in question may be changed to indicate the failed work unit in an easily distinguishable manner. A failed work unit may be e.g. one whose key indicator, such as handling time, differs significantly from other values of the same key indicator of the work units belonging to the same reference group. In an embodiment it is possible to visually show good, bad and neutral key indicators by presenting them in different ways, for example by presenting in green the key indicator values that are good or to be hoped for, in red those that are not to be hoped for, and in white, for example, the normal values that are neutral. On the other hand, a key indicator or some other reference value of the reference group may be presented in a neutral colour that draws less attention, such as grey, which makes a work-unit-specific value that is essential for the monitoring stand out more clearly. Threshold values regarding desired and/or non-desired key indicator values, for example maximum and minimum limits of a desired key indicator value range, may be determined automatically on the basis of a previous information, for example, or a user, trainer or entrepreneur may set them manually over the user interface 33, for example.

The first user interface elements 41 and/or the second user interface elements 51 may be shown on the display. In an embodiment the user interface 33 may be configured to also display other information at the same time, e.g. information necessary for the use and operation of the forest work machine. In that case the second user interface elements 51 may preferably be arranged into a single group on the display 34, e.g. one after the other in a vertical or horizontal direction of the display. In the embodiment of FIG. 5 the first user interface elements are arranged one after the other in a horizontal direction. For the sake of clarity, only some of the first user interface elements are numbered.

In an embodiment, each second user interface element may further comprise an identifier 52, such as a symbol, text or abbreviation, or a combination of these, that represents the key indicators presented by the second user interface element 51 concerned. If the key indicators comprise durations of different work phases, for example, each identifier 52 may represent the work phase in question, for example. In that case the user may easily and quickly see which work phase or other key indicator each second user interface element 51 represents.

In an embodiment, the user interface elements, such as the first user interface elements 41, the second user interface elements 51 and information and identifiers 52 related to these may be displayed by showing to the user the information s/he needs the most in each particular case. In practice this may mean for example that the user interface elements 41, 51 are displayed on and/or hidden from the display in response to e.g. each work phase, the start and/or end of a work phase, a forest work unit operation or the start or end of one, a control or other measure carried out by the user, or a choice made by the user over the user interface 33. The choice made by the user may relate directly to the user interface elements 41, 51 being displayed, i.e. the user may choose which user interface elements 41, 51 are displayed and which not in each case, or the choice may relate to some other selection made by the user, such a selection of a forest work unit operation or a work phase.

In an embodiment, the user interface 33 may be configured to change the graph on the display 34 in response to the user acting on a selection means corresponding to one key indicator. This selection means may preferably be a touch screen, for example, in which case the selection may be made on the same display 34 that is used for presenting the first user interface elements. It is thus possible to determine on the display 34 of the user interface 33 areas 53 corresponding to the second user interface elements, for example, as selection means. In that case the user interface 33 may be configured to show, for example in the form of the graphical representation described in connection with FIG. 4, the key indicator that is presented on the first user interface element an area of which the user is acting on. In FIG. 5 the areas 53 corresponding to the second user interface elements shown with broken lines are slightly larger than the second user interface elements 51, although in the different embodiments they may be exactly the same size as or smaller than the user interface element 51. The graph may present e.g. a key indicator value, its average or its moving average as a function of time or some other cumulative variable, preferably for a work shift in question or for some other predetermined or selectable period of time. The period in question may be one work shift, 3 months or 12 months, for example. On the other hand, in another embodiment, the graphical representation may present a key indicator determined on the basis of the work units of the reference group or other selected data relating to a time period as values divided by the changes, i.e., instead of presenting a value as a function of time, the value of the key indicator for each period between the changes is presented. The period of time for which the key indicator is presented may be determined in advance or the user may select the period with the user interface.

FIG. 6 shows yet another method for presenting to the user information describing the operation of the forest work unit. In this embodiment the forest work unit is a loading and forwarding forest work unit, such as a forwarder or what is known as a combination machine, i.e. a harvester and a forwarder combined. The work units being monitored are loads to be formed and transported, and the reference groups, correspondingly, are load groups. In other respects the method may substantially correspond to those of FIGS. 1 and 2.

In the method of FIG. 6 at least one characteristic of a load handled last or being handled at the time of the determining is determined 605 in the processing means 31, and on the basis of it the load is determined to belong to a specific load group. This characteristic may be at least one of the following or a combination of these: load size in cubic metres, load size in tons, work site or working area from which the load is collected, and work shift. A single load handled last or being handled at the time of the determining is the load that is being handled at the time the load characteristic is being determined or the load whose handling was completed last. Load handling may include work planning, run under load, run without load, loading and/or unloading. For the sake of clarity, the terms 'load' and 'single load' are used in this disclosure to refer to this type of load handled last or being handled at the time of the determining, unless it clearly appears from the context that the terms are used to mean something else.

The disclosed method further includes determining 610 in the processing means 31 at least one key indicator describing a predetermined work phase of the forest work unit for said single load and, in addition, for at least one other single load, the other single load belonging, at least on the basis of said load characteristic, to the same load group as said single load. The predetermined work phase may be one of the following, for example: work planning, run without load, run under load, loading and/or unloading.

The key indicator describing the work phase may be one of the key indicators mentioned in connection with the disclosure relating to FIG. 1, for example. In that case the key indicator describing the work phase may preferably be determined not only for the single load but also for all loads in the same load group or for a predetermined sample of loads from the load group. Naturally, the same determining may be repeated for all load groups separately.

The method further includes identifying 620 a change affecting the operation of the forest work unit. Information about the change is stored 630 into the memory 32. Identification and storing of the information may be carried out as disclosed in connection with the embodiment of FIG. 1.

The method still further includes determining 633 in the processing means 31, on the basis of the key indicators describing the work phase and determined for the single loads in the same load group, a corresponding key indicator common to the load group and describing the work phase. This common work phase key indicator may be a representative value of the key indicator describing the work phase, for example. In the different embodiments the representative value may be computed for a sample between two change events, e.g. load groups, and/or the representative value may be computed as a rolling value in which a predetermined number of stems, loads, work cycles or similar objects of measurement are taken into account and/or computation is re-started after each change event. The representative value may be determined separately in each case from the beginning of the monitoring period to the time of the first change, between each successive times of change and from the last change to the end of the monitoring period.

When the work phase key indicator has been determined for a single load handled last or being handled at the time of the determining and a corresponding common work phase key indicator of the load group has also been determined, the key indicator of the single load may be compared with the key indicator of the load group, more specifically to the key indicator of the load group to which the single load belongs. In other words, the method involves comparing 636 in the processing means 31 the key indicator value describing the work phase of said single load with the common work phase key indicator value of the load group to which said single load belongs. An advantage of this solution is that the key indicator used in the comparison is as well comparable as possible with the key indicator of the single load.

Moreover, the solution includes presenting 640 in the user interface 33 a key indicator for the operation of the forest work unit as a function of time and identified information of changes relating to the monitoring period. This may be implemented in a similar manner as in connection with the embodiment of FIG. 1 or FIG. 2, except that the unit to be handled is a load, instead of a single load.

In the embodiment of FIG. 6 the indicator describing a work phase may be load discharge time, for example, which may be influenced by work planning and load structure, for example, or load collection and/or transport time, which may be influenced by planning of collection. In that case the identified change may e.g. a change in working technique, working method or a change in the time spent on load planning.

Figure 7A:
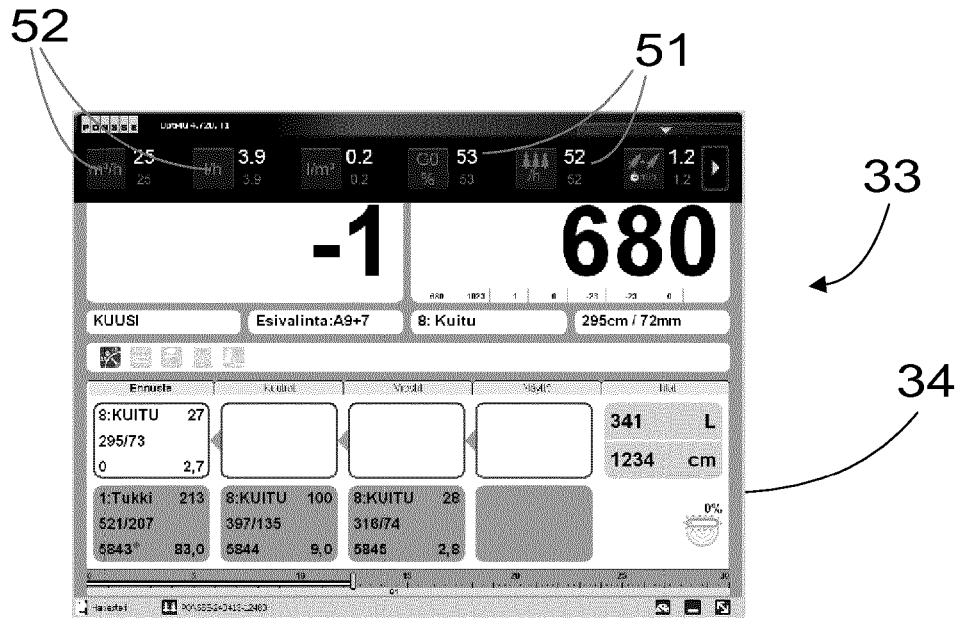
FIGS. 7a, 7b, 7c and 7d illustrate some embodiments of a user interface.
Figure 7B:
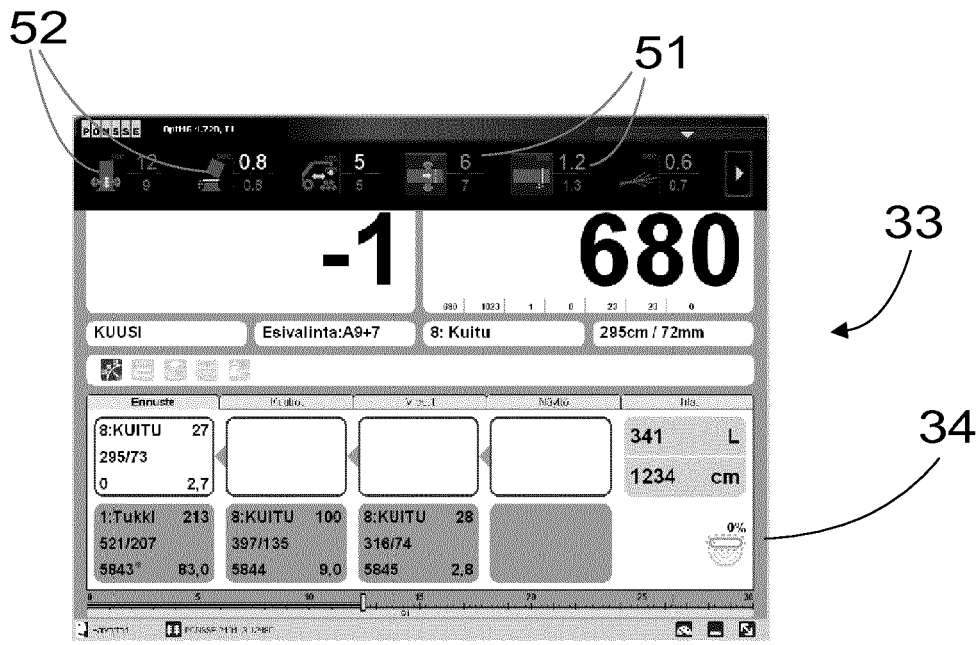

FIGS. 7a, 7b, 7c and 7d illustrate some embodiments of the user interface in connection with a harvester or a combination machine. FIG. 7a shows a user interface 33 which may be associated with the method of FIG. 2 and the arrangement implementing the method, for example. The user interface comprises second user interface elements 51, which are each arranged to represent one key indicator describing the operation of the forest work unit. In the embodiment of FIG. 7a the identifiers 52 comprise a symbol, text or abbreviation in each case or a combination of these representing each key indicator. The user interface 33 in FIG. 7b corresponds to that shown in FIG. 7a, except that instead of general key indicators describing the operation of the forest work unit, FIG. 7b shows key indicators relating to a work unit that is an individual stem. The embodiments of FIGS. 7a and 7b show a black stripe to which the second user interface elements 51 are arranged and which may comprise the method of FIG. 2 and the user interface formed by a corresponding arrangement, for example. Rest of the user interface shown in FIGS. 7a and 7b may be configured to present other information and/or graphs needed in the forest work unit operation and in different work phases. In an embodiment the second user interface elements 51 may be shown only when a work phase or other circumstances render it possible for the user to follow the key indicators describing the operation of the forest work unit.

Figure 7C:
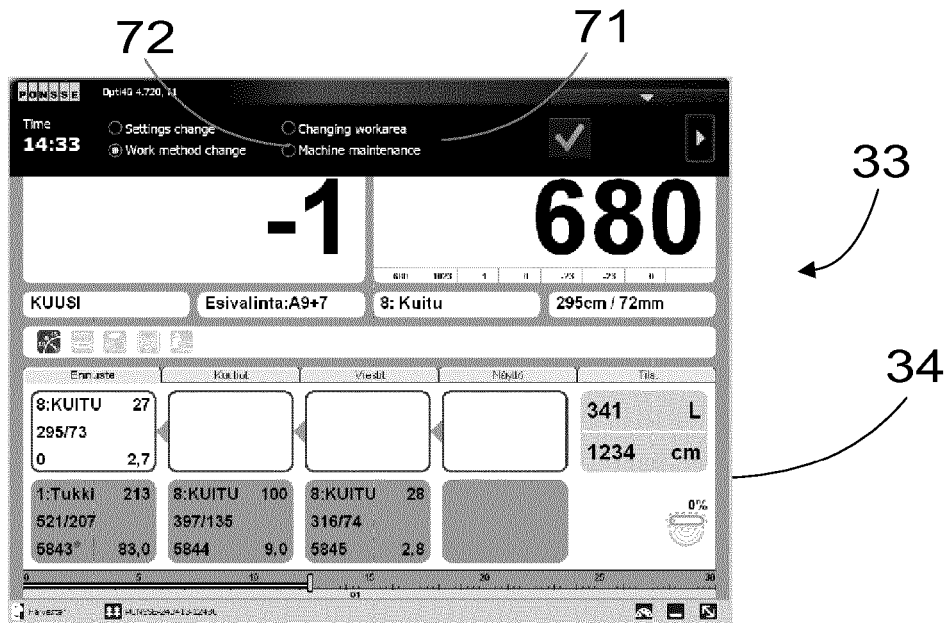

FIG. 7c shows a user interface 33 that comprises a third user interface element 71, which in turn comprises selection means 72 and by acting on these the user may make selections affecting changes, determination of key indicators or method of presentation, or store information relating to these. In the embodiment of FIG. 7c the user may act on the third user interface element 71 and, with the help of the selection means 72, select a change type in order to store the change and the information relating to it.

Figure 7D:
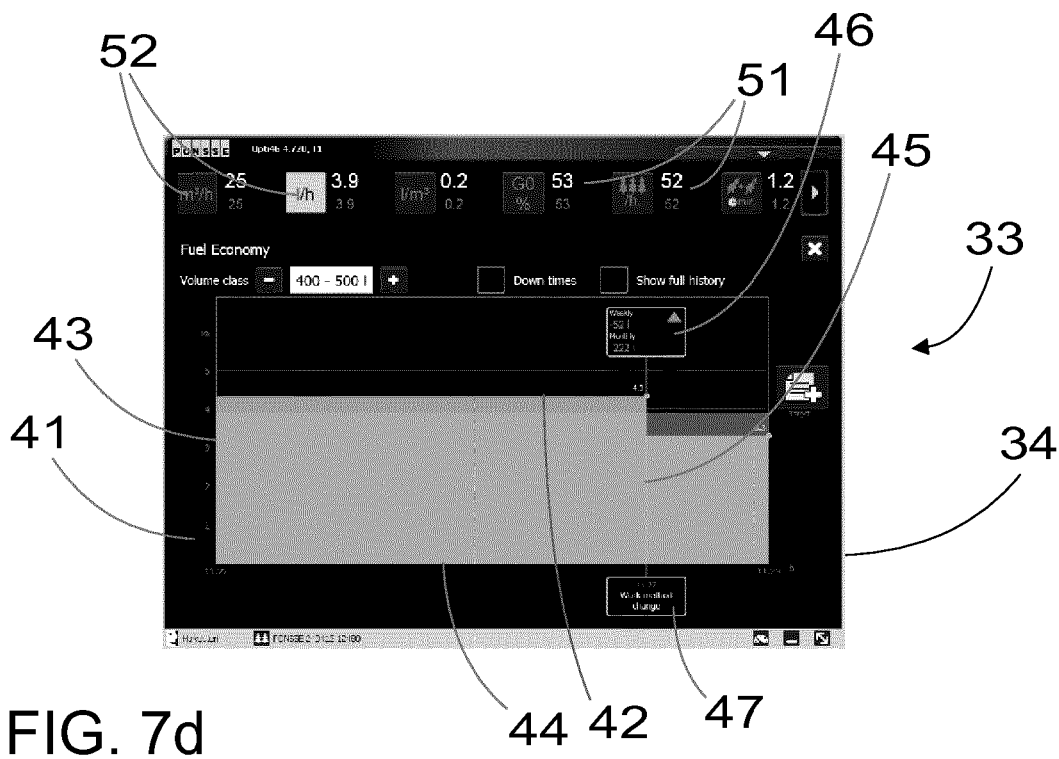

FIG. 7d shows the user interface 33 having second user interface elements 51 arranged to a first part thereof, i.e. to the top in FIG. 7d, which may correspond to the second user interface elements 51 of FIG. 7a, for example, as in FIG. 7d, or the second user interface elements 51 of FIG. 7b. The user interface 33 may comprise a functionality which shows, as the user is acting on an area 53 corresponding to a specific second user interface element 51, which is not defined with borders or numbered in FIG. 7d, a first user interface element 41, which is not defined with borders in FIG. 7d, in the second part of the user interface 33, i.e. the bottom part of FIG. 7d, the element corresponding to a corresponding key indicator and being implemented in accordance with the method of FIG. 1 and a corresponding arrangement. In that case the first user interface element 41 may correspond to the first user interface elements 41 described in connection with FIG. 4 and/or elsewhere in this disclosure and/or to graphs or indicators depicting the operation of the forest work unit. The embodiments of FIGS. 7a to 7d are disclosed as some embodiments in connection with a harvester or a combination machine, although naturally corresponding user interface applications may be implemented with at least partly different key indicators also in connection with forwarders.

In an embodiment, at least one of the following may be presented as a key indicator of a reference group or in addition to it: a comparison with the first key indicator values of a monitoring period, such as a work shift, a comparison with the first key indicator values after a change, and a comparison with the last preceding key indicator values.

In an embodiment the stems that significantly differ from the average value by their diameter, for example, may be left out of the stem group determinations altogether and ignored when key indicators for stem groups are being determined. Also work units of other types may be subject to similar elimination. In that case, the comparison can always be made with the reference group specific to the work unit, while other factors affecting the key indicator except for those of interest in the comparison can be efficiently minimised, which enhances the usefulness of the analysis.

In an embodiment, the reference value, such as a key indicator of a stem group or some other reference group, for example, may be presented only when a sufficiently representative information set has been collected for it, e.g. a predetermined minimum number of work units belonging to the reference group. In an embodiment, a second user interface element 51 that monitors a reference value, such as a stem group key indicator, determined on the basis of a collected representative data set, may be presented with a different appearance by changing the background colour of the user interface element, for example. In an embodiment, the background colour of first user interface elements of this type may be changed to an alert colour, such as yellow.

In an embodiment, there are several different modes of presentation to be selected from in the user interface, and the second user interface elements, for example, may be visible only in one or some of the presentation mode alternatives. Changing the mode of presentation may be arranged to take place in response to a change in a work phase, for example, or the user may select the mode of presentation s/he wishes to use by acting on the user interface.

In an embodiment, the user interface 33 may be configured to display a plural number of different alternative graphic and/or text- or figure-based presentations, such as graphs, tables, or the like. The user interface 33 may be configured to change the information to be presented and/or their mode of presentation in response to the user acting on at least one area of the display 34 corresponding to at least one second user interface element 51 and/or a display area corresponding to a text- and figure-based presentation or on some other predetermined user interface selection element, such as a separate icon for change of presentation. Then, such a presentation may for instance comprise a graphic representation as described above, and as the user acts on the second user interface element or the graphic representation or, to be more precise, to a display area or some other selection means corresponding to one of these, the information to be presented or its mode of presentation is changed. The same information may be presented in a more detailed table format, for example, and/or a flag pattern or some other sign depicting an identified and stored change and any notes relating to the change and/or the effects of the change or other information about the change may be displayed. In an embodiment, the user interface 33 may be configured to change the graphic and/or text- or figure-based presentation in an automated response to a change in a work phase, for example.

In an embodiment, the processing means and the user interface may be configured to evaluate what may cause a change in at least one key indicator. This is particularly advantageous when reasons for a particularly desired or non-desired operation of the forest work unit are analysed. In other words, the arrangement may be arranged to determine at least one source of malfunction at least on the basis of the key indicator values. Preferably, also other measurement and analysis data collected by the processing means may be used in the determining. In an embodiment, the processing means may be further configured to automatically adjust the operation of the forest work unit for fixing a problem that may occur and for guiding the key indicator towards a more desired value.

In an embodiment, the method, arrangement and/or user interface may be arranged to evaluate the state of alertness of the driver. The arrangement may be arranged, for example, to identify a decrease of output, weakening of at least one key indicator and/or some other trend taking place in the key indicator although no changes which might be expected to have an effect on the output or the key indicator have occurred in the settings, conditions, working methods or other registered changes of the forest work unit. The arrangement may thus be arranged to identify a possible decline in the driver's alertness in response to the weakening of at least one key indicator or a variable derived from it, such as output, when no changes affecting the key indicator have been stored and identified. For example, extended work phase times or some other decline in work productivity may be due to a drop in the driver's alertness, for example. This may be presented in the user interface for example by showing the reference values of a previous or the last reference group, by changing the outer appearance, such as colouring or size, of the user interface elements 41, 51, for example, or by displaying to the user a warning of a declining trend. It is thus possible to guide the user to pay attention e.g. to pauses in work, sufficient periods of rest and work planning so that a good level of productivity is maintained.

In yet another embodiment the method, arrangement and user interface disclosed herein may be utilized for identifying service, repair or maintenance measures of the forest work unit. Hence a declining trend in the duration of a specific work phase or in a specific key indicator describing the quality produced by a work phase may indicate a need for repair, servicing or maintenance, such as a wearing of a part that wears. The part may thus need to be replaced or serviced. A declining trend may be presented to the user in a manner corresponding to that described in connection with the embodiment relating to the driver's alertness, for example. Consequently, the driver may be guided to carry out servicing work in time, before the productivity or quality of the forest work unit operations is significantly affected, and/or to perform the maintenance operations at a suitable time with regard to the operation, for example.

In an embodiment, the arrangement may be connected to an external network service of the forest work unit over a wireless network connection, for example. Information may then be transferred in one or two directions, depending on the embodiment. Information on key indicators, characteristics, changes and/or analyses, for example, may be transferred and stored into a network server and/or the network server may be searched for reference values to these information types. In yet another embodiment, data from the arrangement may be transferred over a wireless connection to a wireless mobile device, which enables a business owner or a foreman to monitor the operation of one or more forest work units over a remote connection from wherever s/he is.

The disclosed solution enables immediate and real-time feedback to be provided to an operator of forest work unit with regard to the efficiency of the phases of the forest work unit e.g. in view of costs and time spent as well as the effectiveness of the influence of changes that have been carried out or occurred, such as changes in timber type or terrain and, on the other hand, changes made in settings or operations. The comparison and/or feedback to be provided may be targeted more precisely on the desired elements, because the comparison is made using a comparable sample, i.e. a predetermined stem group, and the most useful method of comparison may be selected in each case. The solution enables disadvantageous operation to be brought up rapidly and lucidly, and thus comparison is more effective. Hence better productivity is achievable when the most effective and economic working methods are selected on the basis of facts obtained through understanding and clearly observing the effect of changes in settings in the operation of the forest work unit. Due to the clear, immediate and visual feedback the solution also enhances the driver's independent learning experience. Moreover, the solution enables the best method of presenting information to be selected in each case.

Use of processing means, such as a programmable logic or a programmable microprocessor, facilitates the monitoring of the work efficiency of state-of-art, often complex and complicated work cycles. In addition, with the processing means it is possible e.g. to improve the processing of groupings that improve the comparability of variables and results that are more difficult to compare and to present the groups in a format that is easier and quicker for the user to understand. For example, differences of some seconds or fractions of second in the duration of a work phase or performance are difficult to observe sensorily, but when the work phase or performance is repeated numerous times during a work shift and a year, for example, the differences may have a significant impact on work efficiency. Furthermore, often work phases and/or performances that are to be mutually compared do not occur one after the other but some other type of output may occur in between, such as stems of different sizes whose measurement values are not mutually comparable.

On the other hand, the type of method, arrangement and user interface disclosed here may also be used for pinpointing as good reference groups as possible. In other words, instead of storing information on a real change affecting the operation of a forest work unit, a corresponding functionality may be used to influence the selection and grouping of work units and reference groups. Information about changes, change data and/or corresponding flags may thus be transferred in purpose in order to find as good key indicator values as possible for work units and/or reference groups. When work unit and/or reference group thresholds, i.e. points of change, that produce the best key indicator values or values exceeding predetermined criteria are found and the selection criteria are such that the key indicator values are sufficiently good or the best within a sample, it is possible to examine e.g. the settings, conditions, identified and stored changes relating to the forest work unit and/or other factors affecting its operation. It is then possible to find combinations of settings or other key indicators or combinations of adjustment settings suitable for specific conditions, for example, which enable a desired operation of the forest work unit or operation as close to the desired as possible.

It is obvious to a person skilled in the art that as technology advances, the basic idea of the invention may be implemented in many different ways. The invention and its embodiments are thus not restricted to the examples described above but may vary within the scope of the claims.

The invention claimed is:

1. A method for optimizing an operation of a forest work unit, the method comprising at least the following steps:
   determining in a processor at least one key indicator describing the operation of the forest work unit through a measurement of the operation of the forest work unit, the at least one key indicator being representative of efficiency or productivity of the forest work unit in relation to a specific forest work task;
   determining a change affecting the operation of the forest work unit and having an influence on a value or a trend of the at least one key indicator;
   storing information about the change into a memory, the information comprising at least a point of the change in relation to a cumulative variable;
   presenting in a user interface the key indicator describing the operation of the forest work unit relating to a monitoring period, and the change along with the information about the change according to occurrence of the change relating to the monitoring period, the change along with the information about the change being presented in a way correlating to the at least one key indicator presented in the user interface, wherein the key indicator describing the operation of the forest work unit is presented as a function of time or other cumulative variable including driving distance, position, map coordinate, amount of fuel consumed, cumulative number of work units handled, and cumulative surface area of work units handled; and
   controlling the forest work unit to adjust a physical operation of the forest work unit based on a correlation between the at least one key indicator and the change along with the information about the change presented in the user interface, such that the at least one key indicator is guided towards a desired value due to the adjusted physical operation of the forest work unit, thereby optimizing the operation of the forest work unit,
   wherein the change comprises at least one of the following: a change relating to the work site, a change relating to working conditions, a change in settings, servicing, repair or maintenance operation carried out on the forest work unit or a part thereof, a change in working method and a change in a key indicator to be monitored when achieving a predetermined target value or trend.

2. The method as claimed in claim 1, wherein the cumulative variable comprises at least one of the following: time, driving distance, position, map coordinate, amount of fuel consumed, cumulative number of work units handled, and cumulative surface area of work units handled.

3. The method as claimed in claim 2, wherein the information about a change further comprises at least one of the following: type of change, changed setting value before the change, changed setting value after the change, changed condition before the change, changed condition after the change, changed working method before the change, and changed working method after the change.

4. The method as claimed in claim 1, wherein the point of the change comprises a point of time of the change.

5. The method as claimed in claim 1, wherein the change is automatically determined by the processor on the basis of data collected by an information system of the forest work unit.

6. The method as claimed in claim 1, wherein the method further comprises extrapolating an effect of the changes to a cumulative variable period longer than the monitoring period.

7. The method as claimed in claim 6, wherein the cumulative variable period is one of the following: work shift, work site and year.

8. The method as claimed in claim 1, further comprising automatically determining in the processor data to be used for determining the at least one key indicator on the basis of at least one predetermined criterion.

9. The method as claimed in claim 8, further comprising the step of selecting by an user with the user interface at least one criterion for restricting the data to be used for determining the at least one key indicator.

10. The method as claimed in claim 1, further comprising:
   determining in advance that the work units to be handled are divided into a predetermined number of reference groups or that each reference group is to comprise a predetermined number of work units; and
   generating at least one criterion determining a reference group by dynamically determining threshold values.

11. The method as claimed in claim 1, further comprising:
providing a plurality of work units subjected to the operations of the forest work unit;
determining in the processor at least one characteristic for grouping the plurality of work units;
determining a first work unit, on the basis of the at least one characteristic, as belonging to a specific reference group;
determining a second work unit, on the basis of the at least one characteristic, as belonging to said specific reference group as the first work unit;
determining in the processor the at least one key indicator for said first work unit, and the at least one key indicator for the second work unit;
determining in the processor, on the basis of the key indicators describing a work phase and determined for the first and second work units belonging to the same specific reference group, a corresponding key indicator common to the specific reference group and describing the work phase;
comparing in the processor the value of the key indicator describing the work phase of said first work unit with the value of the key indicator describing the work phase and common to the specific reference group to which said first work unit belongs; and
presenting in the user interface said key indicator describing the work phase of said first work unit and the corresponding key indicator common to the specific reference group and describing the work phase.

12. The method as claimed in claim 11, wherein each of the plurality of work units further comprises at least one of the following: a stem, load, work site, first stem group, first load group and first work site group.

13. The method as claimed in claim 12, wherein the first work unit is a stem, load, work site being handled at the time of the determining.

14. The method as claimed in claim 12, wherein a reference group comprises at least one of the following: a second stem group, second load group and second work site group.

15. The method as claimed in claim 11, comprising extrapolating an effect of the stored changes to a cumulative variable period longer than the monitoring period.

16. The method as claimed in claim 1, wherein:
the user interface includes a first user interface element and a second user interface element, and
the first user interface element is configured to present at least a graphical representation of the key indicator describing the operation of the forest work unit, the graphical presentation comprising a graph in which the key indicator is presented on a first axis, the cumulative variable is presented on a second axis, and changes are depicted with indicator lines arranged at a position on the second axis corresponding to the cumulative variable of each change.

17. The method as claimed in claim 1, wherein the user interface is configured to enable the changes and information relating to changes to be edited, deleted and added afterwards.

18. The method as claimed in claim 16, wherein is the first under interface element is configured to present a flag pattern arranged to a top or bottom of at least one indicator line to show the change, the pattern comprising the information about the change given in the form of text provided in connection with the flag pattern and/or shown by an outer appearance of the flag pattern.

19. The method as claimed in claim 18, wherein the information about the change provided in connection with the flag pattern in text format comprises at least one of the following: the time of the change, the relationship of the change to some other cumulative variable, the type of the change and a forecast on the effect of the change on a cumulative variable period longer than the monitoring period.

20. The method as claimed in claim 11, wherein:
the user interface includes a first user interface element and a second user interface element,
the first user interface element is configured to present at least a graphical representation of the key indicator describing the operation of the forest work unit, the graphical presentation comprising a graph in which the key indicator is presented on a first axis, the cumulative variable is presented on a second axis, and changes are depicted with indicator lines arranged at a position on the second axis corresponding to the cumulative variable of each change, and
the second user interface element is configured to show at least the key indicator describing the work phase of the first work unit and the corresponding key indicator common to the specific reference group and describing the work phase, and a comparison thereof.

21. An arrangement for optimizing an operation of a forest work unit, the arrangement comprising:
at least a memory;
a processor configured to at least:
determine at least one key indicator describing the operation of the forest work unit through a measurement of the operation of the forest work unit, the at least one key indicator being representative of efficiency or productivity of the forest work unit in relation to a specific forest work task;
determine a change affecting the operation of the forest work unit and having an influence on a value or a trend of the at least one key indicator; and
store information about the change into the memory, the information comprising at least a point of the change in relation to a cumulative variable; and
a user interface configured to present the key indicator describing the physical operation of the forest work unit relating to a monitoring period, and the change along with the information about the change according to occurrence of the change relating to the monitoring period, the change along with the information about the change being presented in a way correlating to the at least one key indicator presented in the user interface, wherein the user interface is configured to present the key indicator describing the operation of the forest work unit as a function of time or other cumulative variable including driving distance, position, map coordinate, amount of fuel consumed, cumulative number of work units handled, and cumulative surface area of work units handled,
wherein the arrangement is configured in such a manner that an actual control of the forest work unit which adjusts a physical operation of the forest work unit, based on a correlation between the at least one key indicator and the change along with the information about the change presented in the user interface, guides the at least one key indicator towards a desired value, thereby optimizing the operation of the forest work unit, and
wherein the change comprises at least one of the following: a change relating to the work site, a change relating to working conditions, a change in settings, servicing, repair or maintenance operation carried out on the forest work unit or a part thereof, a change in working method and a change in a key indicator to be monitored when achieving a predetermined target value or trend.

22. The arrangement as claimed in claim 21, wherein the processor is further configured to:
    determine at least one characteristic for grouping a plurality of work units;
    determine a first work unit, on the basis of the at least one characteristic, as belonging to a specific reference group;
    determine a second work unit, on the basis of the at least one characteristic, as belonging to said specific reference group as the first work unit;
    determine the at least one key indicator for said first work unit, and the at least one key indicator for the second work unit;
    determine, on the basis of the key indicators describing a work phase and determined for the first and second work units belonging to the same specific reference group, a corresponding key indicator common to the specific reference group and describing the work phase; and
    compare the value of the key indicator describing the work phase of said first work unit with the value of the key indicator describing work efficiency and common to the specific reference group to which said first work unit belongs, and wherein the user interface is further configured to present both said key indicator describing the work phase of said first work unit and the corresponding key indicator common to the specific reference group and describing the work phase.

23. The arrangement as claimed in claim 21, further comprising an information system configured to collect data used for determining the change,
    wherein the processor is further configured to automatically determine the change on the basis of the data collected by the information system of the forest work unit.

24. The arrangement as claimed in claim 21, wherein the processor comprises at least one of the following: a programmable logic, programmable microprocessor and embedded information system.

25. The arrangement as claimed in claim 21, wherein the user interface comprises at least a display and at least one user input device.

26. The arrangement as claimed in claim 25, wherein the user input device comprises at least one of the following: at least one button, a mouse, a joystick and a touch screen.

27. The arrangement as claimed in claim 21, the processor is further configured to store information on a characteristic of an individual stem into said memory and retrieve from said memory the stored characteristic to define a stem group to which the individual stem belongs.

28. The arrangement as claimed in claim 21, further comprising a forest work unit or a forest work simulator.

29. A method for optimizing an operation of a forest work unit, the method comprising at least the following steps:
    identifying a change affecting the operation of the forest work unit;
    storing information about the change into a memory;
    determining in a processor at least one key indicator describing the operation of the forest work unit;
    presenting in a user interface the key indicator describing the operation of the forest work unit and information on identified changes relating to a monitoring period, wherein the change affecting the operation of the forest work unit comprises at least one of the following: a change relating to the work site, change relating to working conditions, change in settings, servicing, repair or maintenance operation carried out on the forest work unit or a part thereof, change in working method and a key indicator to be monitored achieving a predetermined target value or trend, and wherein the key indicator describing the operation of the forest work unit is presented as a function of time or other cumulative variable including driving distance, position, map coordinate, amount of fuel consumed, cumulative number of work units handled, and cumulative surface area of work units handled;
    determining in the processor at least one characteristic of at least one first work unit on the basis of which the work unit is determined as belonging to a specific reference group;
    determining in the processor at least one key indicator describing a forest work unit operation for said first work unit and, in addition, at least one second work unit, the second work unit belonging at least on the basis of the characteristic of said work unit to the same reference group as said first work unit;
    determining in the processor, on the basis of the key indicators describing a work phase and determined for the work units belonging to the same reference group, a corresponding key indicator common to the reference group and describing the work phase;
    comparing in the processor the value of the key indicator describing the work phase of said first work unit with the value of the key indicator describing the work phase and common to the reference group to which said first work unit belongs;
    presenting in the user interface said key indicator describing the work phase of said first work unit and the corresponding key indicator common to the reference group and describing the work phase; and
    controlling the forest work unit to adjust a physical operation of the first work unit or the second work unit of the forest work unit, based on the comparison between the key indicator describing the work phase of said first work unit and the corresponding key indicator common to the reference group and describing the work phase, such that the key indicator describing the work phase of said first work unit and the corresponding key indicator common to the reference group and describing the work phase are guided towards desired values due to the adjusted physical operation of the first work unit or the second work unit of the forest work unit, thereby optimizing the operation of the forest work unit.

30. An arrangement for optimizing an operation of a forest work unit, the arrangement comprising:
    at least a memory;
    a processor configured to at least:
        identify a change affecting the operation of the forest work unit;
        store information about the change into a memory; and
        determine at least one key indicator describing the operation of the forest work unit; and
    a user interface configured to present the key indicator describing the operation of the forest work unit and the identified information on changes falling within the monitoring period, wherein the user interface is configured to present the key indicator describing the operation of the forest work unit as a function of time or other cumulative variable including driving distance, position, map coordinate, amount of fuel consumed, cumulative number of work units handled, and cumulative surface area of work units handled, wherein the change affecting the operation of the forest work unit comprises at least one of the following: a change relating to the work site, change relating to working conditions, change in settings, servicing, repair or maintenance operation carried out on the forest work unit or a part thereof, change in working method and a key indicator to be monitored achieving a predetermined target value or trend, wherein the processor is further configured to at least determine:

at least one characteristic of at least one first work unit, on the basis of which the first work unit is defined as belonging to a specific reference group;

at least one key indicator describing a predetermined work phase of the forest work unit both for said first work unit and for at least one second work unit, the second work unit belonging at least on the basis of said characteristic of the work unit to the same reference group as the first work unit; and on the basis of the key indicators describing a work phase and determined for the work units belonging to the same reference group a corresponding key indicator common to the reference group and describing the work phase;

and to compare the value of the key indicator describing the work phase of said first work unit with the value of the key indicator describing work efficiency and common to the reference group to which said first work unit belongs;

wherein the user interface is further configured to present both said key indicator describing the work phase of said first work unit and the corresponding key indicator common to the reference group and describing the work phase, and wherein the arrangement is configured in such a manner that an actual control of the forest work unit which adjusts a physical operation of the first work unit or the second work unit of the forest work unit, based on the comparison between the key indicator describing the work phase of said first work unit and the corresponding key indicator common to the reference group and describing the work phase, guides the key indicator describing the work phase of said first work unit and the corresponding key indicator common to the reference group and describing the work phase towards desired values due to the adjusted physical operation of the first work unit or the second work unit of the forest work unit, thereby optimizing the operation of the forest work unit.

* * * * *